May 11, 1965
C. K. GRIEDER
3,182,752
UNITARY DIRECTIONAL CONTROL FOR GALLOPING HOBBY HORSES
Filed May 7, 1963
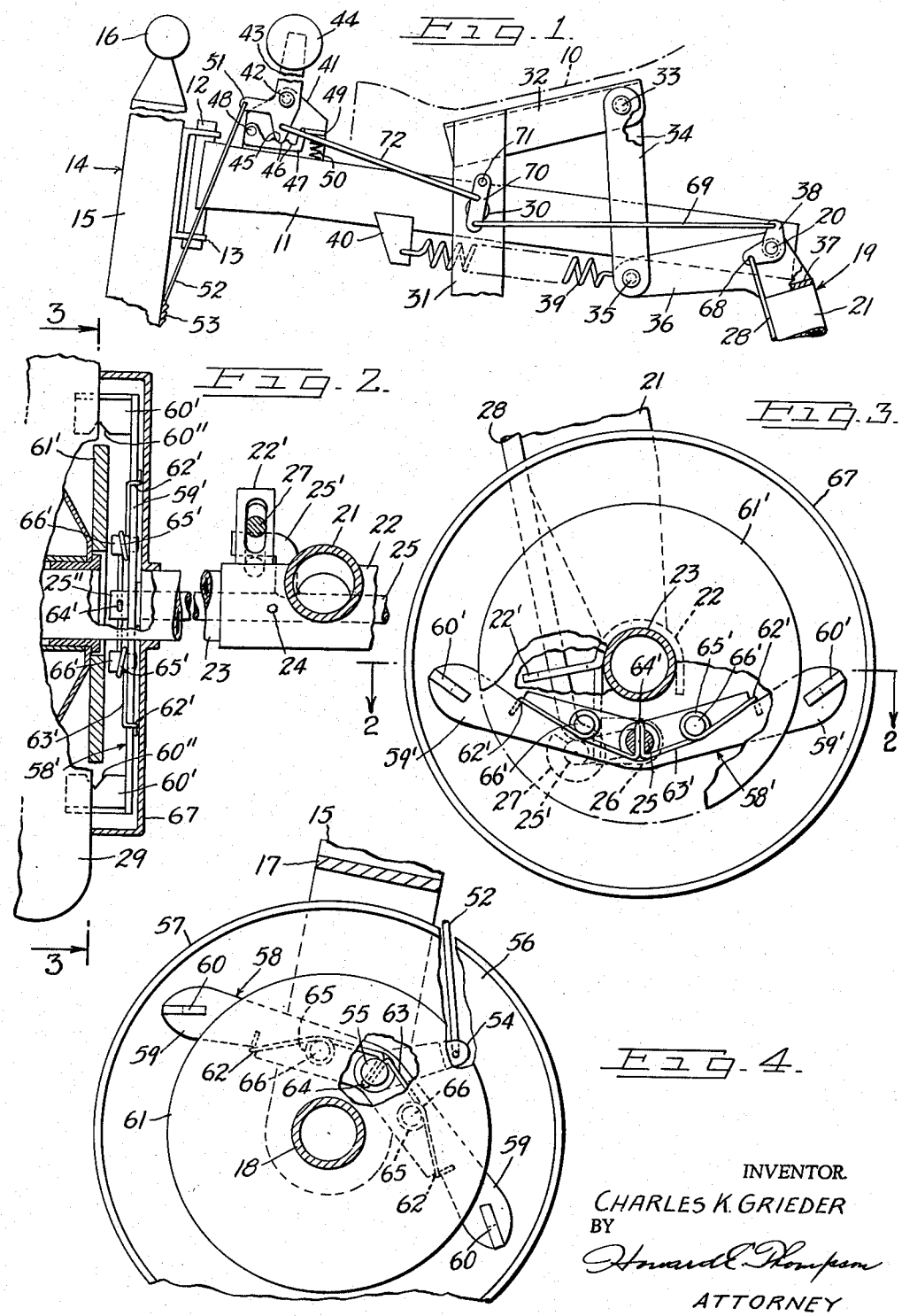
INVENTOR.
CHARLES K. GRIEDER
BY
*Howard E. Thompson*
ATTORNEY

United States Patent Office 3,182,752
Patented May 11, 1965

3,182,752
UNITARY DIRECTIONAL CONTROL FOR
GALLOPING HOBBY HORSES
Charles K. Grieder, 3735 E. Costilla Place,
Littleton, Colo.
Filed May 7, 1963, Ser. No. 278,629
3 Claims. (Cl. 188—26)

This invention relates to apparatus of the type and kind disclosed in my prior Letters Patent Number 3,023,025, granted February 27, 1962. More particularly, the invention deals with a different type of brake structure actuated through the medium of a unitary control in governing the direction of travel of the apparatus. Still more particularly, the invention deals in a novel brake shoe construction and mounting, whereby the desired end result of wheel braking is accomplished in a simple and economical manner.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic side view of the upper frame portion of a device made according to my invention, indicating, in dot-dash lines, the outline of the upper portion of a seat and illustrating the upper portion of the manually actuated control in neutral position, parts of the construction being broken away and in section.

FIG. 2 is an enlarged sectional detail view of one of the rear wheels of the device, with parts of the construction broken away and illustrating the central portion of the axle of said wheel, the section of FIG. 2 being generally on the line 2—2 of FIG. 3.

FIG. 3 is a sectional view substantially on the line 3—3 of FIG. 2, with parts of the construction broken away; and FIG. 4 is a view generally similar to FIG. 3 showing the front wheel of the device and the different arrangement and mounting of the brake shoe.

Considering FIG. 1 of the drawing, I have indicated, in part in dot-dash lines, the upper portion of the seat at 10. The frame of the device comprises an elongated tubular body member 11, pivoted at its forward end, as indicated at 12, in a yoke 13 welded or otherwise secured to the front leg unit 14 or the post 15 thereof, the upper end of the unit having a transverse handgrip bar 16, facilitating rotation of the unit in steering the device.

Welded or otherwise secured to the lower end of the post 15 is a yoke-shaped frame 17, note FIG. 4, supporting a shaft 18, upon which a front wheel, not shown, is rotatably mounted.

To the rear portion of the body 11 is pivoted a rear wheel unit 19, the pivot being illustrated at 20. A tube 21 of the unit 19 supports, at its lower contracted end, an inverted U-shaped shaft coupling plate 22, note FIG. 2. This plate is pinned to the rear wheel shaft 23, as seen at 24. One side of the plate 22 extends downwardly and has a bearing support below the shaft 23 for a brake operating rod 25, the support being indicated in dotted lines at 26 in FIG. 3 of the drawing. The rod 25 has, centrally thereof, an offset hook-shaped finger 25', note FIG. 2, which is mounted in an eye 27 at the lower end of a brake operating rod 28 guided adjacent the plate 22 on an offset portion 22' of the plate, as clearly seen in FIG. 2.

Rotatably mounted on the ends of the shaft 23 are rear wheels, one only of these wheels being shown at 29 in FIG. 2 of the drawing, it being understood that, as both wheels are of the same construction, it is essential only to illustrate one of the wheels.

Pivoted centrally of the body member 11 on the pivot 30 is a U-shaped seat supporting frame 31 supported on the pivot 30. Welded or otherwise fixed to the upper portions of the frame 31 is an inverted U-shaped member 32 supporting a pivot 33 at its rear end, to which a pair of links 34 is pivotally coupled. The links 34 are disposed at outer sides of the body member 11 and support at their lower ends a pivot 35. A U-shaped bracket 36 has its forward end mounted on the pivot 35 and the crosshead 37 of the bracket is welded or otherwise fixed to the upper end of the post 21.

The side plates of the bracket 36 are mounted on the pivot 20. The pivot 20 extends at one side of the bracket 36 and forms a support for a double arm lever 38.

Mounted on the pivot 35 is one end of a spring 39 which extends downwardly through the frame 31 and its forward end is fixed to a support 40 on the body 11, as clearly noted in FIG. 1. The spring 39 controls normal operation of the hobby horse or device, as with other structures of this type and kind.

Welded or otherwise fixed to the body member 11 between the seat 10 and the pivot 12 is an upstanding plate 41 carrying, at its upper end, a pivot 42 for a manually actuated lever 43 having a rounded handpiece 44 at its upper end. The lower end of the lever 43 is rounded, as seen at 45, to operate in one of three notches 46 in a detent 47, pivoted to the plate 41, as seen at 48. The free end of the detent has a raised offset plate 49 forming a seat for the upper end of a spring 50, the lower of 50 being suitably supported on the body member 11. The spring 50, at all times, maintains the detent in operative engagement with the end 45 of the lever in support of the lever in the neutral position, as shown in FIG. 1, or in the forward and reverse operative positions, as will be apparent. The lever 43 includes an extending arm 51 and coupled with this arm is a flexible cable 52, which extends downwardly through a supporting tube illustrated, in part, at 53, the latter being fixed to the post 15 in any desired manner. The lower end of the cable 52 is coupled with a lever 54 mounted on a pivot pin 55 rotatable in the wall 56 of a drum 57 fixed to 17, the pin extending into the drum and pivotally mounted thereon is a forward brake shoe 58.

The brake shoe 58 has angularly disposed ends 59 slotted to support V-shaped hardened brake disc engaging elements 60 for engaging the periphery of the brake disc 61 arranged within the housing and suitably fixed to the front wheel, which is not shown, this attachment on the rear wheel 29 being shown in FIG. 2. The ends 59 of the shoe 58 are notched to receive ends 62 of a spring 63. The central portion of the spring is fashioned to pass through an aperture in the pin 55, as seen at 64 in FIG. 4 of the drawing. Between the central portion 64 of the spring and the end 62, the spring has coils, as at 65 mounted on pins 66 fixed to the shoe 58. The brake shoe 58 is shown in its neutral position in FIG. 4, with the elements 60 out of engagement with the disc 61. However, in operation of the lever 43, either one of the elements 60 will be brought into operative engagement with the disc in braking progress of the hobby horse in one direction or the other, in other words, movement of 45 into engagement with the forward or rearward notch, as will be apparent from a consideration of FIG. 1.

Turning now to the rear wheel construction, it will appear that I have shown at 58' a brake shoe, identical in all respects to the brake shoe 58, except in the position of mounting on the wheel, as seen in FIG. 3. 64' shows the central portion of the spring 63' mounted in an aperture in the rod 25. The other components of the brake shoe structure will be identified by similarly primed reference characters as follows.

59' shows the angularly disposed ends. 60' shows the elements engaging the brake disc 61' fixed to the rear wheel 29, the notching of 60' being clearly illustrated at 60" in FIG. 2 of the drawing, it being understood that elements 60 are similarly formed. 62' shows the ends of the spring 63' and 65' shows the coils arranged upon the pins 66'.

Considering FIG. 2 of the drawing, it will appear that the rod 25 has its ends extending into the drum of each wheel, the one drum 67 fixed to the shaft 23 only being shown and one end of the rod 25 being clearly illustrated at 25". The assemblage of the shoe 58' in the drum 67 will be apparent from a consideration of FIG. 2.

The upper end of the rod 28 is pivotally coupled with one arm of the lever 38, as seen at 68 in FIG. 1 of the drawing. Pivoted to the other arm of the lever 38 is a link or rod 69, which is pivoted to the free end of a lever 70, pivoted to one side of the yoke-shaped frame 31, as seen at 71. Another rod 72 is pivoted to the lever 70 and is pivoted to the lower end portion of the brake operating lever 43, this structure being all clearly illustrated in FIG. 1 of the drawing.

The brake shoe 58', like the shoe, 58 is also shown in its neutral position, corresponding to the neutral position of the lever 43, but, here again, as this lever is moved forwardly or rearwardly from its neutral position, the shoe 58' will operate in conjunction with the shoe 58 in controlling forward and reverse braking action upon the wheels of the hobby horse.

Considering FIG. 4 of the drawing, it will appear that, in upward movement of the cable 52, by movement of the lever 43 rearwardly to bring 45 into the forward notch 45, the lefthand element 60 is moved into engagement with the disc 61. In this operation, the cable 52 swings the lever 54 upwardly to rotate the pivot pin 55 and, in turn, swing the shoe 58 on the pin 55 in an anti or counterclock wise direction by action of the spring 65 at the right of the shoe 58.

In contrast, in the downward movement of the cable 52, by movement of the lever 43 to bring 45 into the rear notch 46, the righthand element 60 will be moved into engagement with the disc 61 by swinging the lever 54 downwardly to rotate the shoe 58 in a clockwise direction on the pivot 55 by action of the spring 65 at the left of the shoe 58. In the above operation which has been described in connection with the front wheel, simultaneously the brakes on the rear wheels are similarly operated upon in providing the two braking actions. In other words, when 52 is moved upwardly, 28 is moved upwardly and when 52 is moved downwardly, 28 is moved downwardly.

For purposes of description, the horse may be said to comprise a vehicle, bearing in mind that the wheeled vehicle, including a seat portion, can be of any desired contour or shape and, particularly, where the vehicle can progress forwardly and rearwardly, as with other devices of this type and kind and, at the same time, this progress is produced by vertical reciprocation of the seat portion of the vehicle. In this connection, a more detailed presentation of devices of this type and kind is found in my prior Letters Patent Number 3,023,026, granted February 27, 1962, together with the patent heretofore identified.

Having fully described my invention, what I claim as new and desired to secure by Letters Patent is:

1. In vehicles of the character defined employing a body member having front and rear wheels and a manually actuated lever pivotally supported in connection with the body member adjacent the forward end of said body member, with means controlling several positions of said manually actuated lever, braking means for all of the wheels of said vehicles, said braking means comprising a brake disc fixed to shafts of each of the wheels, common brake shoes pivotally supported adjacent the discs of each of the wheels, each of said shoes having angularly disposed end portions supporting brake disc engaging elements, a pivot for each shoe, a spring keyed to and supported by the pivot of each shoe and operatively engaging end portions of each shoe for normally maintaining the shoes in neutral position with the elements of the shoes out of engagement with the associated brake disc of each shoe, means in operative engagement will all of the brake shoes and said manually actuated lever for rotating said pivots in actuating the shoes through said springs in movement of said elements into operative engagement with the brake discs, and said springs having end portions engaging said brake shoes in yieldable support of the elements of the brake shoes in engagement with said brake discs.

2. In braking means as defined in claim 1, wherein the pivotal support of the brake shoe of the front wheel of the vehicle includes a lever, and the last named means includes a flexible cable coupled with said last named lever and in direct operative engagement with said manually actuated lever.

3. In braking means as defined in claim 1, wherein the brake shoes of the rear wheels of the vehicle are mounted on ends of an operating rod forming said pivot, said rod being supported in connection with an axle of the rear wheels, and the last named means includes means coupled with said operating rod and in operative engagement with said manually actuated lever for simultaneously operating the brake shoes of said rear wheels.

References Cited by the Examiner
UNITED STATES PATENTS

| | | | |
|---|---|---|---|
| 714,796 | 12/02 | Halstead. | |
| 1,872,872 | 8/32 | Bendix | 188—216 X |
| 2,577,964 | 12/51 | Heuer. | |
| 3,023,025 | 2/62 | Greider | 188—26 X |

ARTHUR L. LA POINT, *Primary Examiner.*

DUANE A. REGER, *Examiner.*